United States Patent [19]

Rising et al.

[11] 4,154,523
[45] May 15, 1979

[54] EXPOSURE DETERMINATION APPARATUS FOR A PHOTOGRAPHIC PRINTER

[75] Inventors: Bradley D. Rising; Warren D. Severin, both of Rochester, N.Y.

[73] Assignee: Eastman Kodak Company, Rochester, N.Y.

[21] Appl. No.: 802,085

[22] Filed: May 31, 1977

[51] Int. Cl.² ............................................. G03B 27/78
[52] U.S. Cl. ....................................... 355/38; 355/77; 355/88
[58] Field of Search .................................... 355/35–38, 355/77, 88; 356/175; 250/226; 358/80

[56] References Cited

U.S. PATENT DOCUMENTS

| | | | |
|---|---|---|---|
| 3,120,782 | 2/1964 | Goddard et al. | 355/38 |
| 3,502,410 | 3/1970 | King et al. | 355/38 |
| 3,653,759 | 4/1972 | Klein | 355/38 |
| 3,697,174 | 10/1972 | McCune | 355/38 |

*Primary Examiner*—L. T. Hix
*Assistant Examiner*—W. J. Brady
*Attorney, Agent, or Firm*—D. M. Woods

[57] ABSTRACT

An exposure control apparatus for use in a photographic printer determines a color correction factor based on color densities of an original. This correction factor is then utilized in customizing a correction matrix which converts signals representing density levels to signals for use in controlling exposures.

10 Claims, 7 Drawing Figures

$\theta = KH$

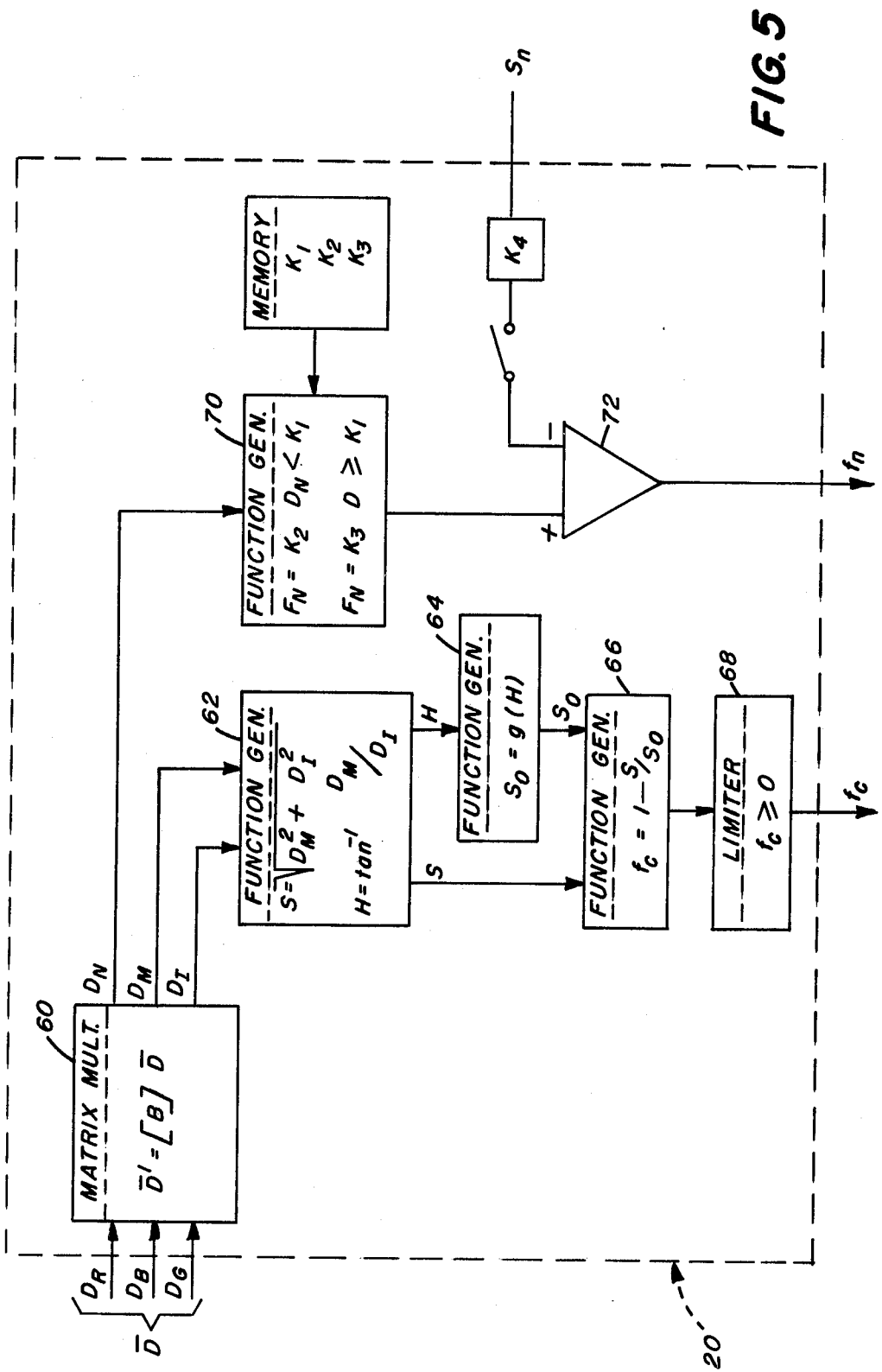

EXPOSURE DETERMINATION APPARATUS FOR A PHOTOGRAPHIC PRINTER

CROSS REFERENCE TO RELATED APPLICATIONS

Reference is made to commonly assigned, copending U.S. Patent application Ser. No. 802,084 entitled "Method and Apparatus for Adjusting the Correction Levels in a Settable Matrix Printer", filed in the name of B. D. Rising on even date herewith.

BACKGROUND OF THE INVENTION

1. Field of the Invention

The invention relates generally to photographic printers having automatic exposure control and more particularly to such printers which base exposure determinations, at least in part, on densities measured for the original as a whole for a set of three primary colors.

2. Description Relative to the Prior Art

Photographic printers incorporating automatic exposure control are well known and produce the bulk of all photographic prints. Because rather small changes in printing times among the primary colors (generally blue, green and red) can have marked effects on final print quality, exposure determination is an operation which is critical to the performance of such printers.

Printers have over the years become more sophisticated with respect to exposure determination and, with this increased sophistication, a greater burden in compensating for picture-taking errors has been undertaken at the printing step in the photographic sequence, i.e., the sequence from film to final print. For example, the most common type of camera (fixed aperture, fixed shutter speed) has no exposure control apparatus and modern automatic printers, in effect, provide these cameras with exposure control by compensating for exposure inaccuracies over a moderate range.

Other situations where printers serve to compensate for adverse influences on picture taking results include illuminant variations (e.g. where the illuminant, say daylight does not correspond to the color balance of the film, say film balanced for tungsten lighting) and out of date film which tends to cause an improper color balance in the final print.

While expanding the role of the printer in correcting for exposure errors can prove highly beneficial, the problem of determining a "best" set of printing exposure times for three primary colors does not yield to easy solution. Most printers, in assessing transparencies for corrective action, measure average transmission densities (commonly called large area transmission densities—LATDs) for three primary colors—say, red, blue and green—and various techniques have been developed for determining exposure times based on these LATD measurements. In early printers, corrective action for any given primary color was based on the measured LATD for that particular color. The advent of the "matrix" printer (see, for example, U.S. Pat. No. 3,120,782) represented a substantial improvement in exposure determination in that interaction effects among the colors could be taken into account; e.g. the interaction resulting because the red density monitor filter blocks green light to a different degree than does the red sensitive emulsion of the printing paper.

[The logarithm of each color exposure for matrix printing is based, at least in part, on a linear function of three different color densities. For further background, see SPSE Handbook of Photographic Science and Engineering, Section 7.10, "Color Printing".]

If a high correction level is maintained with a matrix printer, however, unacceptable prints occur for a significant percentage of scenes. Indeed, "subject failure" is a term which has been used in categorizing situations where the scene content chosen by the photographer "tricks" the exposure control device of the printer into determining an undesirable correction.

Subject failure typically occurs because matrix printers operate based on the assumption that exposures should be highly corrected in a direction for achieving a near neutral print (see U.S. Pat. No. 2,571,697). Such correction, in general, compensates for color-distorting illuminant effects or film aging effects quite satisfactorily and, hence, high correction levels are desirable for transparencies exhibiting those characteristics. High corrections toward neutral average density are undesirable, however, for that population of scenes where one color intentionally predominates, e.g. scenes which have large areas of green grass or blue sky.

To reconcile these conflicting correction requirements, various discriminant parameters have been used which, for preselected regions in color space serve to trigger the introduction of an augmenting exposure which counteracts the influence of the correction matrix (see e.g. U.S. Pat. Nos. 3,502,410 and 3,697,174). Such augmenting exposures may vary quantitatively in relation to location within a region but typically have a fixed color ratio for each region; hence, some hue change, i.e., "color rotation" typically occurs in counteracting the correction. It is also known to direct each augmenting exposure radially from neutral density to avoid color rotation effects. To provide such a secondary correction radially away from neutral density, however, a vector direction must first be defined and then a scaling factor is applied to adjust the magnitude of the augmenting exposure which counteracts the primary correction.

Another approach for changing printer correction utilizes two matrices one for high correction and one for low correction. In U.S. Pat. No. 3,653,759 apparatus is described for switching from a high correction matrix to a low correction matrix for achieving intermediate levels of correction. U.S. Pat. No. 3,697,174 describes apparatus which utilizes a high correction matrix but selectively compresses the times between filter insertions to provide an adjustment to correction level.

SUMMARY OF THE INVENTION

A scaling factor for adjusting color correction is derived based on density values of an original and a similar factor may, as a refinement, also be derived for neutral correction. Such color scaling factor is, according to the invention, used to customize the color correction characteristics of a special type of exposure defining matrix by scaling selected coefficients thereof. In so doing, it is recognized that, by employing an exposure defining matrix that is based on a density reference system having one neutral density coordinate and two independent chromaticity coordinates, a matrix coefficient modification to customize the color saturation correction characteristic (i.e., a correction change introducing little if any neutral change or hue rotation) may be effected, for say a particular category of originals, by equal scaling of a selected subset of the matrix coefficients. Moreover, a separate subset of such matrix coefficient may be scaled by another factor (a neutral scaling factor) to adjust the neutral correction characteristic.

Such a density reference system is preferably introduced, according to the invention, by transforming signals representing measured density levels...typically corresponding to the colors, red, blue and green...to signals corresponding to the basic coordinates of such reference system. (Orthogonal reference systems for color densities having a neutral density coordinate and two independent chromaticity coordinates, say illuminant-chromaticity and green-chromaticity are discussed in some detail in copending Patent application No. 802,084.

In a presently preferred implementation for the invention, a color scaling factor is defined as a function of both (1) the perpendicular offset of the measured density values as referenced to a neutral density coordinate axis (a saturation related parameter), and (2) the angular orientation of the measured density values as referenced to such neutral density axis (a hue related parameter). Such scaling factor is, for this presently preferred implementation, caused to go from one to zero, as a linear function of such perpendicular distance, at rates which are empirically developed functions of hue (angle). This type of relationship is selected because the likelihood of a subject failure is strongly correlated to the average hue of the original and tends to increase with average saturation. As the likelihood of subject failure increases, the scaling factor is changed in accordance with such relationship to reduce the color saturation correction.

This particular scale factor defining approach can be compared with the known approach of scaling augmenting exposures (see prior art discussion) in accordance with hue and saturation. According to the invention, however, the scaling factor is applied to modify selected coefficients of the exposure determining matrix, as is discussed more fully below, and the modified matrix operates on the transformed density signals to define a set of exposure signals. Such exposure signals are then transformed to signals representing primary color exposures for use in controlling printer exposure times; i.e., the exposures in terms of the special set of coordinates are transformed to exposures for a set of primary colors such as red, green, and blue.

As an alternative the customized exposure defining matrix may be converted to a corresponding matrix for the primary color coordinate system which would then operate on primary color density signals to define exposures.

The above-discussed approach to exposure determination may be implemented using either analog or digital signal processing circuitry, and this fact is emphasized in the detailed description regarding the invention which follows. In that description, reference is made to the figures, wherein:

FIG. 5 is a diagram, in block form, of a preferred scaling signal selection apparatus;

Figure 6:
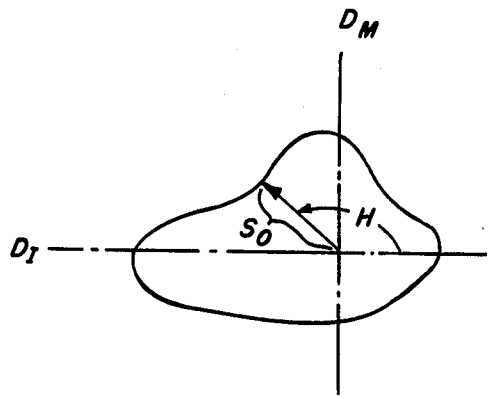

FIG. 6 indicates a saturation contour; and

Figure 7:
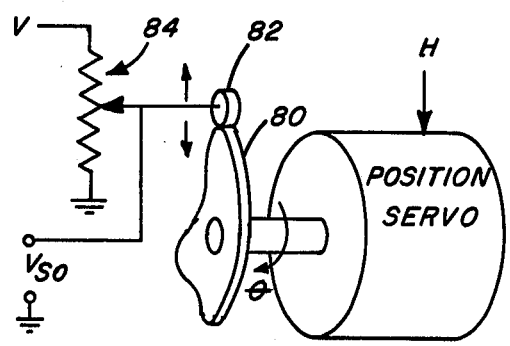

FIG. 7 is a perspective drawing of an analog function generator for saturation contours.

Figure 1:
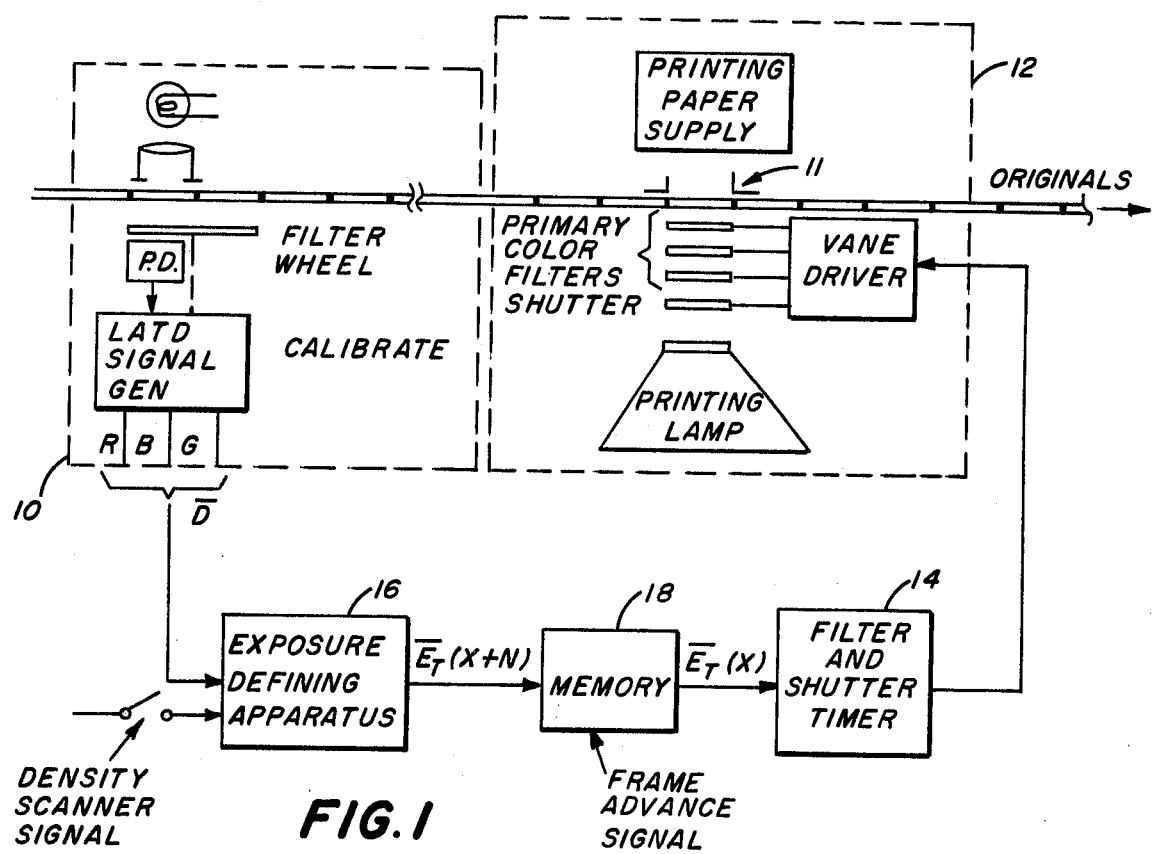
FIG. 1 is a system diagram, generally in block form, of a printer suitable for implementation of the invention.

Referring to FIG. 1, an automatic photographic printer of a type suitable for implementation of the invention includes a density monitor 10 for examining originals, usually transparencies, to produce signals representing average densities (generally LATD's as mentioned above) for a set of three primary colors. Such originals are indexed along a predetermined path and density monitoring may occur at an exposure site where copies are produced or may occur in advance of such site (as for the indicated site 11) depending on printer configuration.

At the exposure site 11, an exposure apparatus 12 directs light for modulation by an original and the modulated light then produces a latent image in a photograhic copy, say a photographic print. (A subtractive-type printer is shown, however, the invention is equally applicable to additive-type printers or other types of color copying apparatus.) Such exposure apparatus includes means, for example, a set of three solenoid operated filter vanes, for adjusting relative exposure durations for three primary colors; generally, the three colors detected by the density monitor 10.

Means such as a timer 14 controls the primary color exposures by supplying control signals to the exposure apparatus 12, as is known in the art. The times for the exposures are determined in accordance with a set of signals $\overline{E}_T$ which represent log-exposures for three primary colors and are produced by an exposure defining apparatus 16. (The bar notation serves to indicate a signal or set of signals having more than one information component . . . e.g. one component for each of three reference colors.) To develop the signals $\overline{E}_T$ the apparatus 16 analyzes the LATD signals from the density monitor 10 and may also respond to other density information, for example, information based on a scan of specially defined elemental areas of the original (see e.g. U.S. Pat. Nos. 3,708,676 and 3,790,275).

If the original, say an original X, is not at the exposure site at the time the signals $\overline{E}_T$ are produced, as would generally be the case where the density monitor 10 is remote from the exposure site, then a storage buffer 18 becomes necessary so that a proper correspondence of signals to originals can be maintained (storage to provide for a spacing of N originals is indicated). An indexing signal related to the advance of originals serves to update the output signal of the buffer 18.

The present invention, as will become more apparent below, relates to improvements for the exposure defining apparatus 16.

Figure 2:
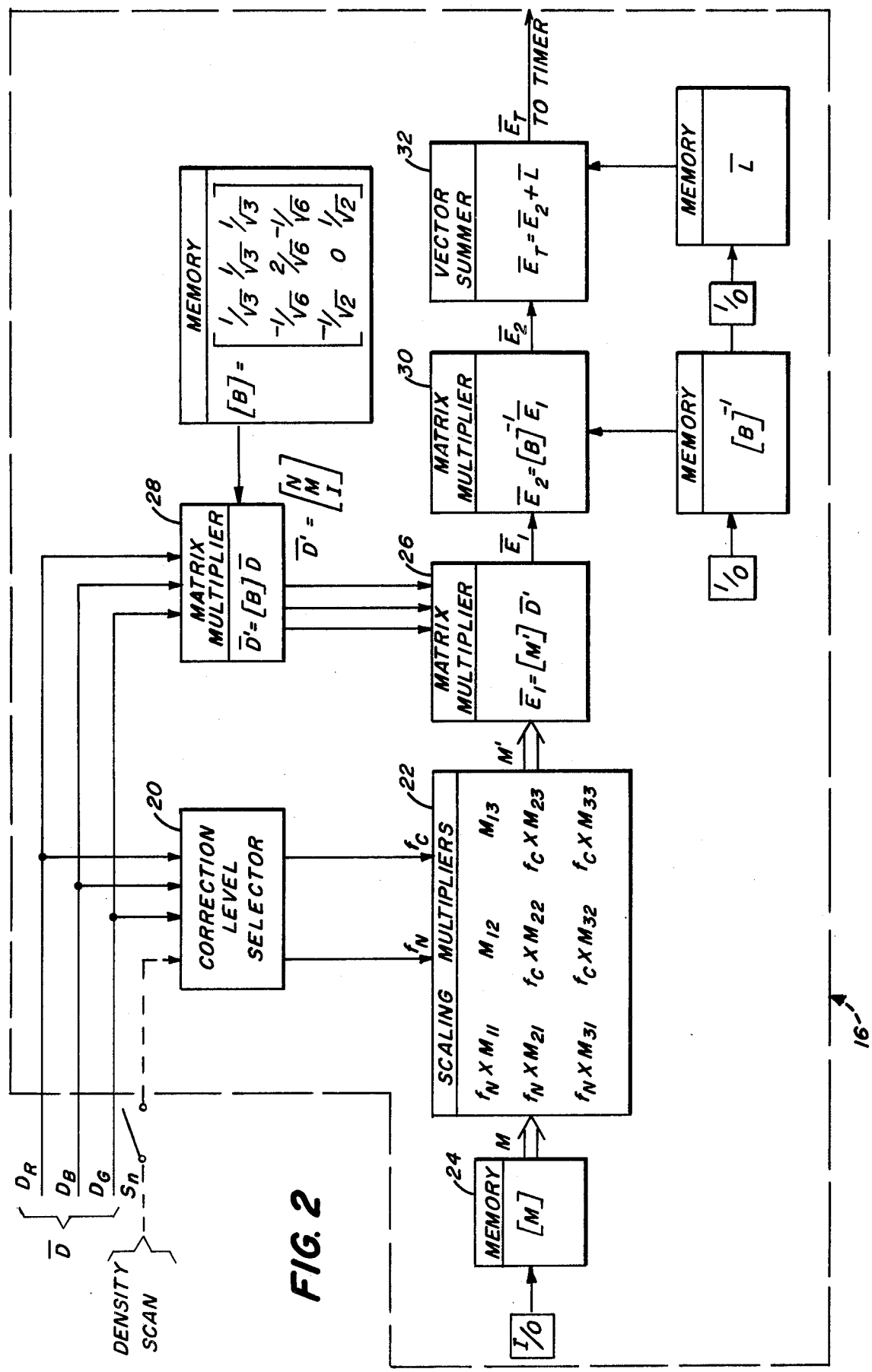
FIG. 2 is a system diagram, in block form, for a preferred exposure defining apparatus according to the invention.

Referring to FIG. 2, a preferred methodology for the invention is indicated by a diagram of an exposure defining apparatus in block form, where the blocks, as will become more clear below, represent basic signal processing operations and can, generally, be implemented using basic analog or digital signal processing apparatus. If the printer cooperates with a digital computer, the methodology according to the invention may be incorporated within such computer by well-known computer programming techniques.

Density signals $\overline{D}$ for a set of primary colors (denoted R, B, and G for the preferred colors red, blue and green respectively) are supplied from the density monitor 10 (FIG. 1) to the exposure defining apparatus 16. Such signals $\overline{D}$ are analyzed by a correction level selector 20 (considered in detail below) which produces a color correction factor signal $f_c$ and may also produce a neutral density correction factor signal $f_n$; otherwise $f_n$ is, in effect, set equal to 1.0. Such signals $f_c$ and $f_n$ represent factors which preferably range between 1.0 and 0.0 and are supplied to a set of scaling multipliers 22. Signals denoted m are supplied to the multipliers 22 by a memory 24 and represent predefined coefficients for a high-correction-level, exposure defining matrix [M]; say a 90% neutral density correction level and an 85% color saturation correction level. For analog implementation the memory 24 could be a bank of potentiometers and for digital implementation various well known types of digital memories might be employed.

The exposure defining matrix [M] is based on a density coordinate system having neutral density as one of three basic orthogonal coordinates as is discussed in copending U.S. Patent Application 802,084, filed May 31, 1977. For preferred implementations, the coefficients correspond to a coordinate system having neutral (gray), illuminant chromaticity and green chromaticity as basic parameters.

Figure 3:
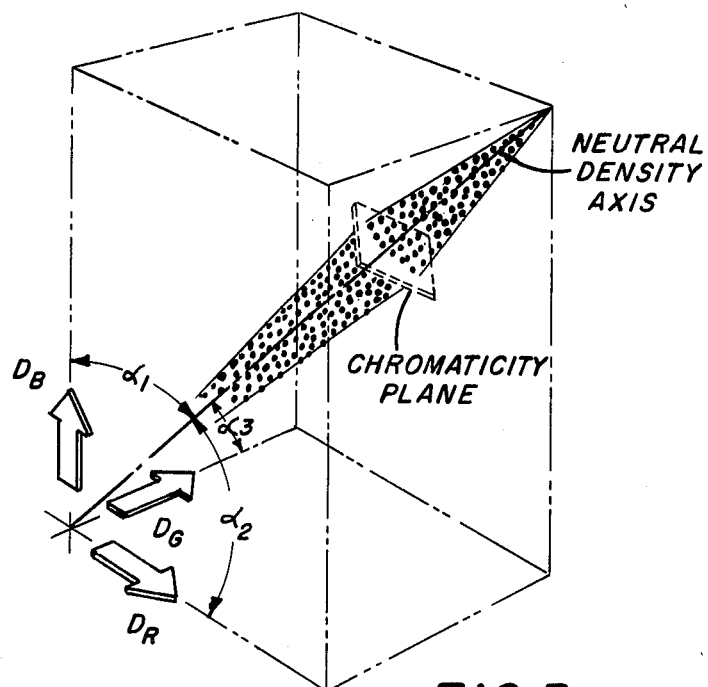
FIG. 3 is a teaching diagram indicating a population of density points as represented in a three-dimensional coordinate system.

Referring to FIG. 3 a representative population of density points is shown relative to a cartesian red-blue-green color coordinate system. Neutral or gray parameters relate to exposures or densities referenced to an axis having generally equal angles ($\alpha_1 \cong \alpha_2 \cong \alpha_3$) to the primary red, blue, and green color axes. Green-chromaticity parameters relate to exposures or densities referenced along a projection of the green primary color axis onto a plane perpendicular to the neutral axis, i.e., a chromaticity plane. Illuminant-chromaticity parameters relate to exposures or densities referenced to the direction, in a chromaticity plane, which is perpendicular to the green-chromaticity direction. Using such a coordinate system, the neutral axis has an orientation generally corresponding to the direction of greatest unwanted variability in density among originals. Moreover, the illuminant-chromaticity parameter corresponds to the direction in which the second-greatest unwanted density variability tends to occur.

Considering again FIG. 2, the color scaling factor signal $f_c$ is preferably used to scale the coefficient signals which relate the chromaticity densities to chromaticity exposures ($m_{22}$, $m_{23}$, $m_{32}$, $m_{33}$ for the coordinate system indicated in FIG. 2). Such scaling serves to adjust the degree of correction toward neutral without introducing hue or neutral shifts, i.e., essentially, only saturation is corrected. This selection of coefficient signals for scaling involves a recognition that those contributions to neutral exposure that are introduced as a function of chromaticity densities are not highly correlated to desirable saturation correction and, hence, fixed values (not scaled ones) are preferable for signals $m_{12}$ $m_{13}$.

Neutral correction may also be customized, as a refinement for the invention, by scaling a separate set of correction matrix coefficients, i.e., by scaling others of the signals m. All coefficient signals which are intended to multiply a neutral density signal ($m_{11}$, $m_{21}$, and $m_{31}$ for the system of FIG. 2) are preferably scaled by a common factor $f_n$. Such scaling recognizes that the chromaticity exposures based on interactions with neutral density (the $m_{21}$, and $m_{31}$ components) are desirably correlated to the diagonal term neutral exposure component (the $m_{11}$ component).

The above-described scaling of coefficient signals produces the modified matrix signals m', representing a customized correction matrix, which are supplied to a matrix multiplier 26. (Such multipliers are well known for analog and digital signal processing). To utilize such a customized correction matrix, the density signals D are transformed by a matrix multiplier 28 to correspond to a special coordinate system as mentioned above. For performing such transformation coefficient signals based on the following coefficient matrix B are preferably used:

$$[B] = \begin{bmatrix} 1/\sqrt{3} & 1/\sqrt{3} & 1/\sqrt{3} \\ -1/\sqrt{6} & 2/\sqrt{6} & -1/\sqrt{6} \\ -1/\sqrt{2} & 0 & 1/\sqrt{2} \end{bmatrix}$$

Such coefficient signals transform the density signals for red, blue and green into density signals for neutral, green chromaticity and illuminant chromaticity. These latter density signals are converted to the exposure signals $\bar{E}_1$, at the multiplier 26. The exposure signals $\bar{E}_1$ are then transformed at a matrix multiplier 30, using the inverse matrix $[B]^{-1}$, to a set of exposure signals $\bar{E}_2$ which correspond to the primary colors red, blue and green.

A predetermined color balance exposure signal L is added to the signals $\bar{E}_2$ at a summer 32 to produce the exposure signals $\bar{E}_T$ which are supplied to exposure controlling means such as the timer 14 (see FIG. 1). The color balance exposure is typically determined using a standard transparency as is well known in the art.

While, for the preferred implementation, exposures $\bar{E}_1$, are first determined and then transformed to primary color exposures $\bar{E}_2$, the modified coefficient signals M' may, as an alternative, be transformed to correspond to the primary color coordinate system. The signals so transformed would then be used to convert the primary color density signals to the primary-color exposure signals $E_2$ directly.

The above discussed apparatus has been described in terms of known types of circuit elements (generally multipliers, memories, and summers) and the prescribed signal processing may involve either analog signals, digital signals or a hybrid of analog and digital signals. One element, however, the scaling signal selector 20 remains to be described in detail.

Figure 4:
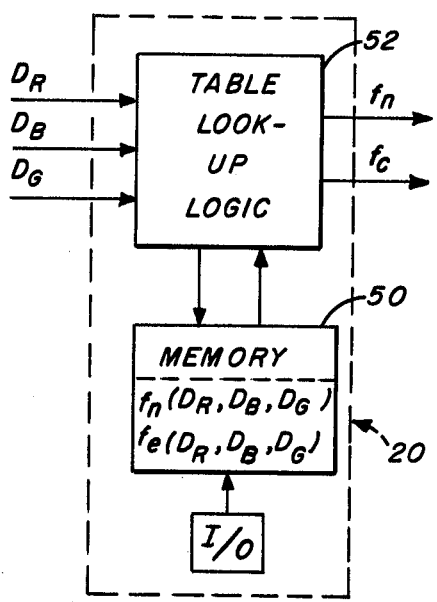
FIG. 4 is a diagram, in block form, of a scaling signal selection apparatus.

Referring to FIG. 4, there is shown a relatively simple arrangement for defining the scaling coefficients. Corresponding factor and density values ($f_c$ and $f_n$ versus $\bar{D}$) are stored in a memory 50. A signal corresponding to a factor of 1.0 is, for example, identified with density zones where the normal correction is satisfactory (the unaltered matrix coefficients, as mentioned above, preferably yield a correction of around 90% for neutral and 85% for color saturation). In zones which are empirically identified as having a high likelihood of subject failure, the level of $f_c$ is reduced to correspond to a factor less than 1.0. The table for signal $f_n$, on the other hand, might provide for unity scaling generally, with a change toward reduced correction for zones corresponding to low light level photography.

A table-look-up logic device 52 responds to the density signal D and cooperates with memory 50 to determine the signals $f_c$ and $f_n$ for the corresponding density zone.

Referring to FIG. 5 a preferred form for the selector 20 utilizes a matrix multiplier 60 to transform the density signals $\bar{D}$ to a set of density signals $\bar{D}'$ corresponding to the presently preferred special coordinate system. (The identifiers $D_N$, $D_M$, and $D_I$ denote respective component signals corresponding to the colors neutral, green chromaticity and illuminant chromaticity respectively.) Preferably the multiplier 28 (FIG. 2) and multiplier 60 are the same. Saturation-and hue-representative signals (S and H respectively) are produced by a function generating device 62, for example, based on the relationships:

$$S = \sqrt{D_M^2 + D_I^2}$$

$$H = \tan^{-1}(D_M/D_I)$$

A discrete valued, hue-representative signal (H) may, as an alternative, be developed based on the signs and relative magnitudes of the $D_M$ and $D_I$ signals. Such a signal can be produced using known logic circuit techniques or by a series of tests programmed into a digital computer. A function generator 64 provides a cutoff signal ($S_o$) representing a color saturation level for zero correction. The definition of the cutoff signal as related to the hue signal H is developed empirically recognizing that the likelihood of subject failure is strongly correlated to hue. An exemplary "$S_o$ contour" is indicated in FIG. 6. Referring to FIG. 7, an analog apparatus suitable for defining the relationship of the signal H to the signal $S_o$ has a servo driven cam 80 which is shaped in accordance with the desired relationship of the signals $S_o$ and H, and a cam follower 82 which is coupled to the moveable contact of a voltage divider 84. Preferably, however, the relationship is defined using a table-look-up device cooperating with a memory having tables of corresponding values ($S_o$ versus H).

The factor signal $f_c$ is produced by a function generator 66, which may be a divider circuit and a summer, according to the relationship:

$$f_c = 1 - S/S_o$$

This relationship provides a linear decrease in the factor signal $f_c$ as saturation increases with a zero value at the saturation $S_o$. A limiter 68 prevents the factor signal $f_c$ from going negative. With such a definition, the factor $f_c$ reduces correction as saturation increases, this in recognition of a generally higher likelihood of subject failure with increasing saturation, and the rate of such decrease is related to hue.

A factor signal $f_n$ may be produced by a non linear function generator and, for example, might have a value of 1.0 (nominal correction) over the usual neutral density range and a reduced value for neutral densities below a threshold level (indicated as $K_1$ in FIG. 5). The threshold level might, for example, be selected so that density levels falling below such level have a high likelihood of being existing light exposures for low light levels.

An adjustment based on detailed scan information (the signal $S_n$ mentioned above) may be included at a summer 72, for example, to reduce correction for high contrast negatives.

The factor signals $f_c$ and $f_n$ produced by the selector 20 are supplied to multipliers 22 as discussed above.

The invention has been described in detail with reference to preferred implementations thereof, however variations and modifications are possible within the spirit and scope of the invention. For example, additive printers and other color copiers may incorporate the invention. While, generally, the originals will be transparencies, prints may also serve as originals in suitable color copying apparatus.

Moreover, while matrix customization according to the invention generally aids in avoiding hue changes, selective scaling of coefficient signals may be employed to introduce wanted hue changes. For example, the coefficents relating chromaticity densities to chromaticity exposures may be scaled by related but different factors to shift "warm" originals e.g. low light level originals toward blue.

What is claimed is:

1. Apparatus for making color copies, the apparatus having means for examining an original to produce a set of density signals representing density magnitude characteristics of said original for a set of primary colors; and exposure means, responsive to a set of exposure-representative signals, for controlling color copying exposures; the apparatus comprising:
 a. means for producing a set of coefficient signals corresponding to a three-dimensional color reference system having a neutral color as a basic parameter, said coefficient signals representative of matrix coefficient values for converting signals representing densities to signals representing exposures;
 b. means, responsive to said density signals for modifying said coefficient signals in relation to the density characteristics of the original, whereby such modified coefficient signals represent matrix coefficient values that are customized to the original;
 c. means for producing a set of exposure-representative signals in accordance with products of the density magnitudes and the matrix coefficient values that are represented by said density and modified coefficient signals; and
 d. means for supplying said set of exposure-representative signals to such exposure means.

2. An exposure defining apparatus according to claim 1 wherein said reference system has three basic orthogonal parameters consisting of neutral, green-chromaticity and illuminant-chromaticity.

3. For use in a photographic printer of the type that monitors an original to produce a primary set of density signals corresponding to a primary color coordinate system having basic parameters for red, blue, and green, apparatus for producing signals representing primary color exposures comprising:

means for converting such a primary set of density signals to a secondary set of density signals referenced to a secondary color coordinate system which is generally orthogonal and has a neutral color as a basic parameter;

factor means for producing a scaling factor signal according to a predefined relationship to a selected subset of density signals;

means for producing a set of base coefficient signals representative of a set of coefficients that are preselected for converting density signals that are referenced to the secondary coordinate system, to exposure-representative signals referenced to such secondary coordinate system;

scaling means for multiplying selected ones of said base coefficient signals by said scaling factor signal to produce a modified set of coefficient signals;

matrixing means for matrix multiplying said secondary set of density signals by said modified coefficient signals to produce a first set of exposure-representative signals that is referenced to said secondary coordinate system; and converting means for converting said first set of exposure-representative signals to a second set of exposure-representative signals that is referenced to the primary color coordinate system whereby signals are provided which represent primary color exposures that are customized to the density characteristics of the original.

4. Apparatus according to claim 3 wherein: (a) the secondary coordinate system has a neutral color parameter and first and second chromaticity parameters; (b) said factor means produces a chromaticity scaling factor; (c) said set of base coefficient signals includes a first subset of signals which convert density-representative signals that are referenced to a chromaticity parameter, to exposure-representative signals that are referenced to a chromaticity parameter; and, (d) said scaling means multiplies the first subset of base coefficient signals by the chromaticity scaling factor in producing modified coefficient signals.

5. Apparatus according to claim 4 wherein: (a) said scaling factor means also produces a neutral scaling factor; (b) said set of coefficient base signals further includes a second subset of signals for converting the neutral-representative density signal to signals representing exposures referenced to the secondary coordinate system; and (c) said scaling means multiplies said second subset of coefficient signals by said neutral scaling factor.

6. Apparatus according to claim 5 wherein said chromaticity and said neutral scaling factor signals represent values in a range between 1.0 and 0.0.

7. Apparatus according to claim 4 wherein said chromaticity parameters are green-chromaticity and illuminant-chromaticity.

8. A method for producing exposure-representative signals for use in color copying apparatus of the type which monitors an original to produce density-representative signals for three respective primary colors, such method comprising:
(a) converting the primary color density signals to special density signals referenced to a secondary coordinate system which is generally orthogonal and has a neutral-color basic parameter and first and second basic chromaticity parameters;
(b) establishing a scale factor signal based on a predefined relationship to a selected subset of density signals;
(c) establishing a set of coefficient signals representing preselected coefficients for converting densities referenced to the secondary coordinate system to exposures for that coordinate system;
(d) multiplying selected ones of said coefficient signals by said scaling factor signal to produce a set of customized coefficient signals;
(e) matrix multiplying said special density signals by said customized coefficient signals to produce a first set of exposure signals referenced to the secondary coordinate system; and
(f) transforming said first set of exposure signals to a second set of exposure signals referenced to primary color coordinates.

9. A method according to claim 8 wherein said chromaticy parameters correspond to green-chromaticity and illuminant chromaticity.

10. For use in a photographic printer of the type that monitors an original to produce a primary set of density signals corresponding to a primary color coordinate system having basic parameters for red, blue, and green, apparatus for producing signals representing primary color exposures comprising:
means for converting the resulting primary set of density signals to a secondary set of density signals referenced to a secondary color coordinate system which is generally orthogonal and has a neutral color as a basic parameter;
factor means for producing a scaling factor signal according to a predefined relationship to a selected subset of density signals;
means for producing a set of base coefficient signals representative of a set of coefficients that are preselected for converting density signals that are referenced to the secondary coordinate system to exposure-representative signals referenced to such secondary coordinate system;
scaling means for multiplying selected ones of said base coefficient signals by said scaling factor signal to produce a modified set of coefficient signals;
means for converting said modified set of coefficient signals to primary coefficient signals referenced to the primary color coordinate system; and
matrixing means for matrix multiplying said primary color densities by said primary coefficient signals to produce a set of exposure-representative signals referenced to the primary color coordinate system;
whereby signals are provided which represent primary color exposures that are customized to the density characteristics of the original.

* * * * *